US010263245B2

United States Patent
Jeon et al.

(10) Patent No.: US 10,263,245 B2
(45) Date of Patent: Apr. 16, 2019

(54) COMPLEX FOR ANODE ACTIVE MATERIAL, ANODE INCLUDING THE COMPLEX, LITHIUM SECONDARY BATTERY INCLUDING THE ANODE, AND METHOD OF PREPARING THE COMPLEX

(71) Applicants: Samsung Electronics Co., Ltd., Suwon-si, Gyeonggi-do (KR); Samsung SDI Co., Ltd., Yongin-si, Gyeonggi-do (KR)

(72) Inventors: Seongho Jeon, Yongin-si (KR); Minje Park, Seoul (KR); Mijong Kim, Suwon-si (KR); Gyusung Kim, Suwon-si (KR); Jaemyung Lee, Seoul (KR)

(73) Assignees: SAMSUNG ELECTRONICS CO., LTD., Gyeonggi-Do (KR); SAMSUNG SDI CO., LTD., Gyeonggi-Do (KR)

( * ) Notice: Subject to any disclaimer, the term of this patent is extended or adjusted under 35 U.S.C. 154(b) by 311 days.

(21) Appl. No.: 15/097,444

(22) Filed: Apr. 13, 2016

(65) Prior Publication Data

US 2016/0315311 A1 Oct. 27, 2016

(30) Foreign Application Priority Data

Apr. 24, 2015 (KR) .................. 10-2015-0058274
Mar. 17, 2016 (KR) .................. 10-2016-0032069

(51) Int. Cl.
*H01M 4/131* (2010.01)
*H01M 4/133* (2010.01)
(Continued)

(52) U.S. Cl.
CPC .......... *H01M 4/131* (2013.01); *H01M 4/133* (2013.01); *H01M 4/366* (2013.01); *H01M 4/386* (2013.01);
(Continued)

(58) Field of Classification Search
CPC ... H01M 4/131; H01M 4/133; H01M 10/0525
See application file for complete search history.

(56) References Cited

U.S. PATENT DOCUMENTS 5,340,670 A * 8/1994 Takami .................. H01M 4/587
423/445 R
2009/0176159 A1 * 7/2009 Zhamu .................. H01M 4/483
429/222
(Continued)

FOREIGN PATENT DOCUMENTS

CN 102522534 A 6/2012
EP 2515365 A1 10/2012
(Continued)

OTHER PUBLICATIONS

European Search Report for European Patent Application No. 16166142.6 dated Jun. 20, 2016.
(Continued)

*Primary Examiner* — Kenneth J Douyette
(74) *Attorney, Agent, or Firm* — Cantor Colburn LLP

(57) ABSTRACT

A complex for anode active material, the complex including: a conductive framework having a spherical skein shape; and metal particles dispersed in the conductive framework. Also an anode including the complex, a lithium secondary battery including the anode, and a method of preparing the complex.

34 Claims, 16 Drawing Sheets

(51) Int. Cl.
  *H01M 10/0525*  (2010.01)
  *H01M 4/36*  (2006.01)
  *H01M 4/38*  (2006.01)
  *H01M 4/587*  (2010.01)
  *H01M 4/62*  (2006.01)
  *H01M 4/60*  (2006.01)
  *H01M 10/052*  (2010.01)
  *H01M 4/02*  (2006.01)

(52) U.S. Cl.
  CPC ........... *H01M 4/587* (2013.01); *H01M 4/625* (2013.01); *H01M 10/0525* (2013.01); *H01M 4/604* (2013.01); *H01M 4/606* (2013.01); *H01M 4/608* (2013.01); *H01M 4/62* (2013.01); *H01M 4/624* (2013.01); *H01M 4/626* (2013.01); *H01M 10/052* (2013.01); *H01M 2004/027* (2013.01); *H01M 2300/0025* (2013.01)

(56) References Cited

U.S. PATENT DOCUMENTS

| | | | |
|---|---|---|---|
| 2010/0273058 A1 | 10/2010 | Lee et al. | |
| 2011/0068001 A1* | 3/2011 | Affinito | H01M 4/13 204/242 |
| 2014/0087255 A1* | 3/2014 | Kim | D01D 5/0007 429/219 |
| 2014/0120418 A1* | 5/2014 | Song | C01G 23/047 429/211 |
| 2014/0242461 A1 | 8/2014 | Hwang et al. | |
| 2014/0356707 A1* | 12/2014 | Kwon | H01M 4/366 429/213 |

FOREIGN PATENT DOCUMENTS

| | | |
|---|---|---|
| EP | 2711338 A1 | 3/2014 |
| JP | 2014235925 A | 12/2014 |
| WO | 2014/109534 A1 | 7/2014 |

OTHER PUBLICATIONS

Lee et al.,"Facile conductive bridges formed between silicon nanoparticles inside hollow carbon nanofibers", Nanoscale, vol. 5, 2013, pp. 4790-4796.

Bang et al., "High-Performance Macroporous Bulk Silicon Anodes Synthesized by Template-Free Checmical Etching", Adv. Energy Mater., vol. 2, 2012, pp. 878-883.

Coppey et al., "Decorated carbon nanotubes by silicon deposition in fluidized bed for Li-ion battery anodes", Chemical Engineering Research and Design, vol. 91, 2013, pp. 2491-2496.

He et al., "Porous carbon nanotubes improved sulfur composite cathode for lithium-sulfur battery", J. Solid State Electrochem, 2013, 17: 1641-1647.

Liu et al., "A Yolk-Shell Design for Stabilized and Scalable Li-Ion Battery Alloy Anodes", American Chemical Society, Nano Letters, vol. 12, 2012, pp. 3315-3321.

Liu et al., "Three-Dimensional Hierarchical Ternary Nanostructures for High-Performance Li-Ion Battery Anodes", American Chemical Society, Nano Letter, 13, 2013, pp. 3414-3419.

Shu et al., "Cage-like carbon nanotubes/Si composite as anode material for lithium ion batteries", Electrochemistry Communications, vol. 8, 2006, pp. 51-54.

Wu et al., "Stable cycling of double-walled silicon nanotube battery anodes through solid-electrolyte interphase control", Nature Nanotechnology, vol. 7, May 2012, pp. 310-315.

* cited by examiner

COMPLEX FOR ANODE ACTIVE MATERIAL, ANODE INCLUDING THE COMPLEX, LITHIUM SECONDARY BATTERY INCLUDING THE ANODE, AND METHOD OF PREPARING THE COMPLEX

CROSS-REFERENCE TO RELATED APPLICATION

This application claims priority to and the benefits of Korean Patent Application No. 10-2015-0058274, filed on Apr. 24, 2015, and Korean Patent Application No. 10-2016-0032069, filed on Mar. 17, 2016, in the Korean Intellectual Property Office, and all the benefits accruing therefrom under 35 U.S.C. § 119, the contents of which are incorporated herein in their entirety by reference.

BACKGROUND

1. Field

The present disclosure relates to a complex for an anode active material, an anode including the complex, a lithium secondary battery including the anode, and methods of preparing the complex.

2. Description of the Related Art

Silicon-based anode materials with high capacity (theoretically about 4,200 mAh/g) have drawn attention as anode materials of next generation lithium batteries. However, the volume of the silicon-based anode materials expands 300% or greater during intercalation and deintercalation of lithium. Such a large volume expansion may cause cracks and pulverization of the silicon-based anode material, resulting in electrical short circuits and continuous decomposition of an electrolyte. Accordingly, charge/discharge characteristics (e.g., initial charge/discharge efficiency, average charge/discharge efficiency, lifespan characteristics, and high-rate discharge characteristics) of the anode material rapidly deteriorate, and thus commercialization of a silicon-based anode material has been delayed despite its high theoretical capacity.

In order to improve these characteristics, much research has been conducted into developing an anode material with high capacity and excellent charge/discharge characteristics by changing the shape and structure of silicon. Although research has recently been conducted into preventing deterioration of battery characteristics due to volume expansion of silicon-based anode materials by introducing porous silicon particles and controlling nanostructures such as silicon nanowires and nanotubes, such nanostructure control technology uses expensive processing techniques such as high-temperature vacuum chemical vapor deposition, sacrificial templating, and chemical etching. Thus, it is difficult to commercialize the silicon-based anode materials. In addition, nano-sized particles have a large specific surface area which can contribute to adverse thermal stability of batteries, further impeding commercialization.

For example, a method of preparing three-dimensional porous silicon by depositing a plurality of silver particles on bulk silicon and forming a plurality of pores in the bulk silicon by chemical etching has been attempted. In the method, the plurality of pores reduces a total expansion ratio of the silicon. However, this method uses an expensive noble metal and the porous silicon has relatively low porosity.

As another example, a method of preparing double-walled silicon nanotubes (DWSINTs) by forming a coating layer on external walls of silicon nanotubes using a carbonaceous material has been attempted. According to this method, the expansion ratio of silicon may be reduced by the coating layer. However, commercialization thereof is difficult because it uses specialized methods, such as chemical vapor deposition (CVD).

Therefore, there is a need to develop an anode active material having a high capacity and improved charge/discharge characteristics, e.g., initial discharge capacity, initial charge/discharge efficiency, and lifespan characteristics.

SUMMARY

Provided is a complex for an anode active material including a conductive framework having a spherical skein shape and metal particles dispersed in the conductive framework.

Provided is an anode including the complex for the anode active material.

Provided is a lithium secondary battery including the anode.

Provided are methods of preparing the complex.

Additional aspects will be set forth in part in the description which follows and, in part, will be apparent from the description, or may be learned by practice of the presented embodiments.

According to an aspect of an embodiment, a complex for anode active material includes a conductive framework having a spherical skein shape; and metal particles dispersed in the conductive framework.

The conductive framework having a spherical skein shape may include conductive materials having a fibrous shape.

The spherical skein shape may be a shape in which the conductive materials having a fibrous shape are agglomerated or intertwined to form an electrically conductive network and have a spherical shape as an overall appearance The conductive framework having a spherical skein shape may have a porosity of about 10% to about 85%.

The conductive materials may be flexible.

The conductive framework may have a particle diameter of about 0.1 to about 100 micrometers ($\mu$m).

The conductive materials may have an average diameter of about 0.5 to about 1,000 nanometers (nm).

The conductive materials may have an average aspect ratio of 10 or greater.

The conductive materials may include carbon nanotube, carbon nanofiber, conductive metal, conductive polymer, or a combination thereof.

The complex for anode active material may further include an additional conductive material in the conductive framework.

The conductive metal may include copper, aluminum, iron, zinc, silver, palladium, nickel, titanium, gold, platinum, or a combination thereof.

The conductive polymer may include a polythiophene, polyacetylene, a poly(paraphenylene), a polyaniline, a poly(paraphenylene vinylene), a polypyrrole, or a combination thereof.

The complex may have a bulk density of about 0.1 to about 2.3 grams per cubic centimeter (g/cm$^3$).

The complex may have a porosity of about 10% to about 85%.

The complex may have a root mean square (RMS) surface roughness of about 0.1 to about 100 nm.

The metal particles may include: silicon (Si), germanium (Ge), tin (Sn), lead (Pb), antimony (Sb), bismuth (Bi), zinc (Zn), aluminum (Al), titanium (Ti), nickel (Ni), cobalt (Co), cadmium (Cd), or a combination thereof; an alloy thereof; an oxide thereof; a carbide thereof; a nitride thereof; a sulfide thereof; a phosphide thereof; or a combination thereof.

The complex may further include a protective shell surrounding the conductive framework.

The protective shell may include a carbonaceous material, an oxide material, a fluoride material, a lithium ion solid electrolyte material, an ionic conductive polymer material, or a combination thereof.

The carbonaceous material may include a hard carbon, which is an amorphous carbonaceous material obtained by pyrolyzing various organic materials including a phenol resin or a furan resin; a soft carbon, which is an amorphous carbonaceous material obtained by carbonizing cokes, needle cokes, coal tar pitch, petroleum pitch or heavy oil; graphene; a graphite sheet; or a combination thereof.

The oxide material may include aluminum oxide, titanium oxide, zinc oxide, iron oxide, zirconium oxide, cerium oxide, tin oxide, silicon oxide, magnesium oxide, or a combination thereof.

The fluoride material may include aluminum fluoride, lithium fluoride, iron fluoride, or a combination thereof.

The lithium ion solid electrolyte material may include a sulfur-based amorphous electrolyte including $Li_2S$—$P_2O_5$, a NASICON structured material including $Li_{1+x+y}Al_xTi_{2-x}Si_yP_{3-y}O_{12}$ (x=0.3 and y=0.2), a garnet structured material including $Li_7La_3Zr_2O_{12}$, a germanium-phosphorus-sulfur compound including $Li_{10}GeP_2S_{12}$, or a combination thereof.

The ionic conductive polymer material may be a lithium-ion conductive polymer material.

The ionic conductive polymer material may include polyethyleneoxide (PEO), polypropyleneoxide (PPO), polyethylene glycol (PEG), polyacrylonitrile (PAN), polymethacrylic acid ester, polyvinylidene fluoride (PVdF), poly(vinylidene fluoride-hexafluoropropylene) copolymer (PVdF-HFP), poly(methyl acrylate) (PMA), poly(methyl methacrylate) (PMMA), or a combination thereof, a modified product thereof, a derivative thereof, a random copolymer thereof, an alternating copolymer thereof, a graft copolymer thereof, a block copolymer thereof, or a combination thereof.

The protective shell may have a thickness of about 0.01 to about 10 μm.

The complex may include about 10 to about 90 parts by weight of the metal particles, based on 100 parts by weight of the conductive framework.

According to an aspect of another embodiment, an anode includes the complex.

The anode may further include an additional anode active material.

According to an aspect of another embodiment, a lithium secondary battery includes the anode.

According to an aspect of another embodiment, a method of preparing a complex for anode active material includes: combining a fibrous conductive material and metal particles in a medium to form a dispersion; agitating the dispersion to form a pre-complex including a framework formed of the conductive material and the metal particles dispersed therein; and applying a shearing force to the pre-complex to form the complex, wherein the complex includes a conductive framework having a spherical skein shape, and the metal particles dispersed therein.

The method may further include forming a protective shell on the surface of the complex by applying a protective shell-forming material on the surface of the complex.

The method may further include forming a protective shell on the surface of the complex by wet-mixing the complex with a protective shell-forming material and drying the mixture.

The medium may include alcohol, acetone, water, N-methyl-2-pyrrolidone (NMP), toluene, tetrahydrofuran (THF), hexane, or a combination thereof.

The forming of the protective shell on the surface of the complex may be performed by preparing a mixture by mixing the complex with the protective shell-forming material, adding the mixture to a bladed hybridization system, and applying a shearing force to the mixture by rotating the blades at a predetermined speed.

The forming of the protective shell on the surface of the complex may be performed by mixing the complex with the protective shell-forming material, and milling the mixture using a ball mill.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Figure 1:
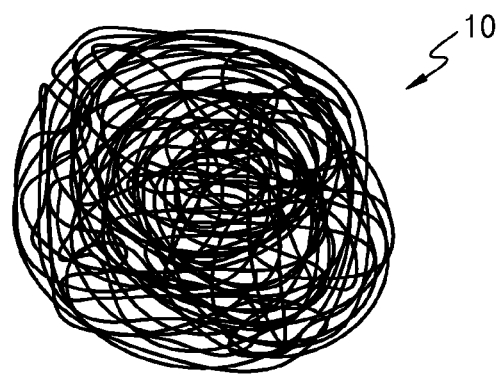
FIG. 1 is a schematic diagram of a conductive framework having a spherical skein shape used as a framework included in a complex for anode active material according to an embodiment.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects. As used herein, the term "and/or" includes any and all combinations of one or more of the associated listed items. "Or" means "and/or." Expressions such as "at least one of," when preceding a list of elements, modify the entire list of elements and do not modify the individual elements of the list.

It will be understood that when an element is referred to as being "on" another element, it can be directly on the other element or intervening elements may be present therebetween. In contrast, when an element is referred to as being "directly on" another element, there are no intervening elements present.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer," or "section" discussed below could be termed a second element, component, region, layer, or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. "At least one" is not to be construed as limiting "a" or "an." It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure.

Similarly, if the device in one of the figures is turned over, elements described as "below" or "beneath" other elements would then be oriented "above" the other elements. The exemplary terms "below" or "beneath" can, therefore, encompass both an orientation of above and below.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10% or 5% of the stated value.

As used herein, the term "metal particle" refers to a metal oxide particle, a metal carbide particle, a metal nitride particle, a metal sulfide particle, and a metal phosphide particle as well as a metal particle itself.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

Hereinafter, a complex for anode active material, a method of preparing the same, an anode, and a lithium secondary battery according to an embodiment will be described in further detail.

A complex for anode active material according to an embodiment includes a conductive framework having a spherical skein shape and metal particles dispersed in the conductive framework.

The conductive framework may comprise a fibrous conductive material. As used herein, the term "spherical skein shape" refers to a shape in which fibers or yarns of a length of the conductive material are associated into a network, e.g., agglomerated, intertwined, bundled, or disposed upon one another to define an overall shape of the conductive framework, which has a spherical overall appearance. The conductive material may have any suitable length, and may have a length of about 1 micrometer ($\mu$m) to about 1000 $\mu$m, about 2 $\mu$m to about 800 $\mu$m, or about 4 $\mu$m to about 600 $\mu$m. The conductive framework may comprise, e.g., consist of, a single length of the conductive material, or may comprise a plurality of lengths of the conductive material.

For example, the complex may comprise about 1 to about 1000 lengths of the conductive material, about 2 to about 800 lengths of the conductive material, or about 4 to about 600 lengths of the conductive material.

As used herein, the term "conductive framework" refers to a net structure comprising, e.g., consisting of, the conductive material, thereby having electrical conductivity throughout the overall structure of the complex.

The metal particles may comprise a metal, a metalloid, or a combination thereof. As used herein, the term "metal" refers to metallic as defined in the Periodic Table of Elements selected from Groups 1 to 17, including the lanthanide elements and the actinide elements, with the exception of the metalloids. Representative metals include copper, aluminum, iron, zinc, silver, palladium, nickel, titanium, gold, platinum, or a combination thereof. "Metalloid" means B, Si, Ge, As, Sb, Te, or a combination thereof.

While not wanting to be bound by theory, it is believed that because the conductive framework has a spherical skein shape, and because the conductive materials contained in the conductive framework are entangled, in a battery using an anode including the complex, electrical short circuits between the conductive materials and between the conductive materials and the metal particles may be prevented during charging and discharging. In addition, since the conductive framework has a spherical shape, an additional protective shell may be easily formed, thereby improving stability of the battery.

As used herein, the term "complex" refers to a material comprising two or more materials having different physical or chemical properties from each other, wherein the complex has properties different from individual materials constituting the complex, and wherein the individual materials are macroscopically or microscopically separated and distinguishable from each other in a finished structure of the complex.

The conductive framework having a spherical skein shape, which is inclusive of a skein shape, may include a conductive material in the form of a fiber. Particularly, since the spherical skein shape is a shape in which the fibrous conductive material is agglomerated or intertwined, the complex comprises an electrically conductive network and has a spherical shape as an overall appearance.

In addition, since the conductive framework having the spherical skein shape has an internal space sufficient for accommodating expanded metal particles, the complex hardly expands despite the expansion of the metal particles, and thus stress applied to an anode including the complex is minimized. Thus, the complex may prevent a phenomenon in which a lifespan of an anode decreases due to a weakened binding force of a binder or pulverization of particles caused by expansion and contraction of metal particles used as an active material. An absolute value of a volume change of the complex from a discharge state to a charged state, or from a charged state to a discharged state, may be about 1 to about 100%, about 2 to about 75%, or about 4 to about 50%.

In addition, although some of the metal particles may be cracked or pulverized due to repeated expansion and shrinkage in the course of charging and discharging, the conductive framework having a spherical skein shape may allow the cracked or pulverized metal particles to maintain electrical connectivity with the conductive material. Thus, the conductive framework may prevent generation of disconnected or dead metal particle.

The conductive material may be flexible. As used herein, the term "flexible or flexibility" refers to a property having bending modulus of 1 terapascal (TPa) or less as measured according to ASTM D790. Due to the flexibility of the conductive material, the conductive material may be bent to some degree while the metal particles expand, and the flexibility of the conductive material is understood to prevent electrical short circuits and may provide an additional inner space to accommodate the expanded metal particles.

Figure 2A:
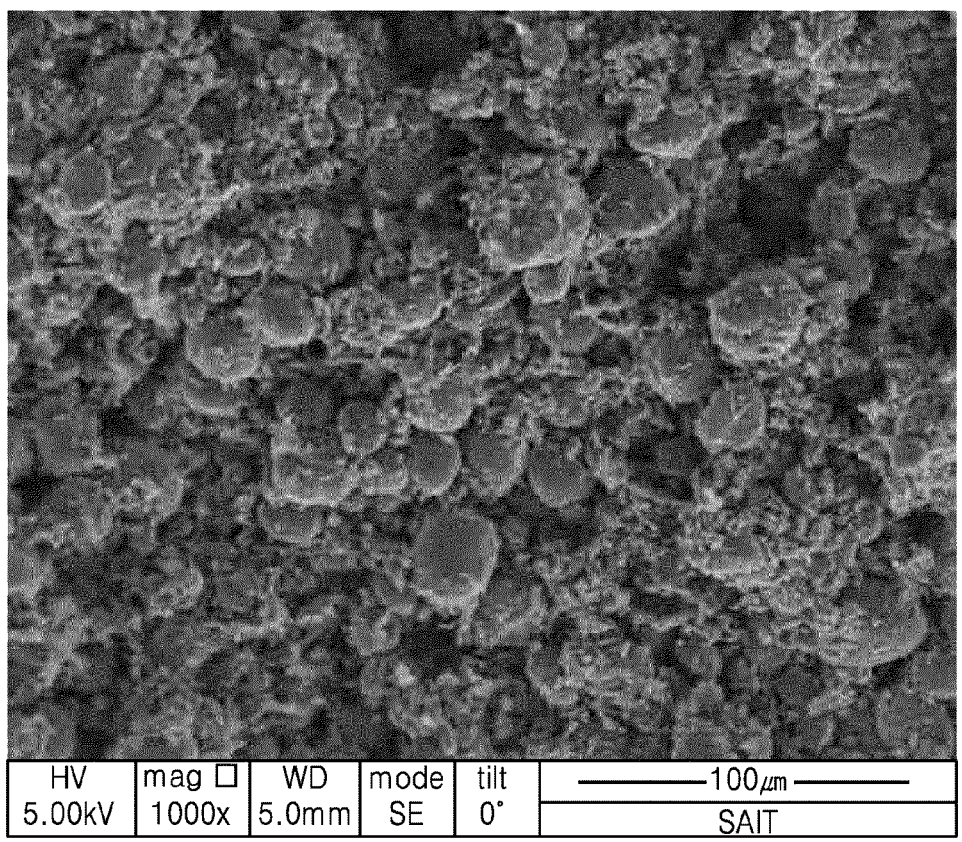
FIG. 2A to 2C show scanning electron microscope (SEM) images of a conductive framework having a spherical skein shape used as a framework included in a complex for anode active material according to an embodiment.
Figure 2B:
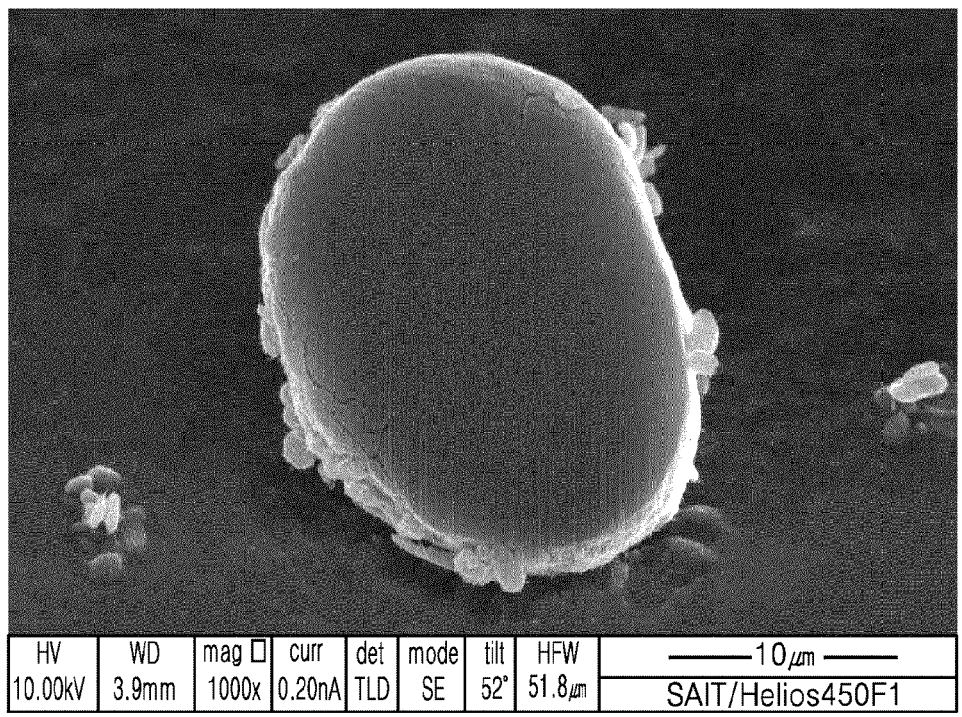
Figure 2C:
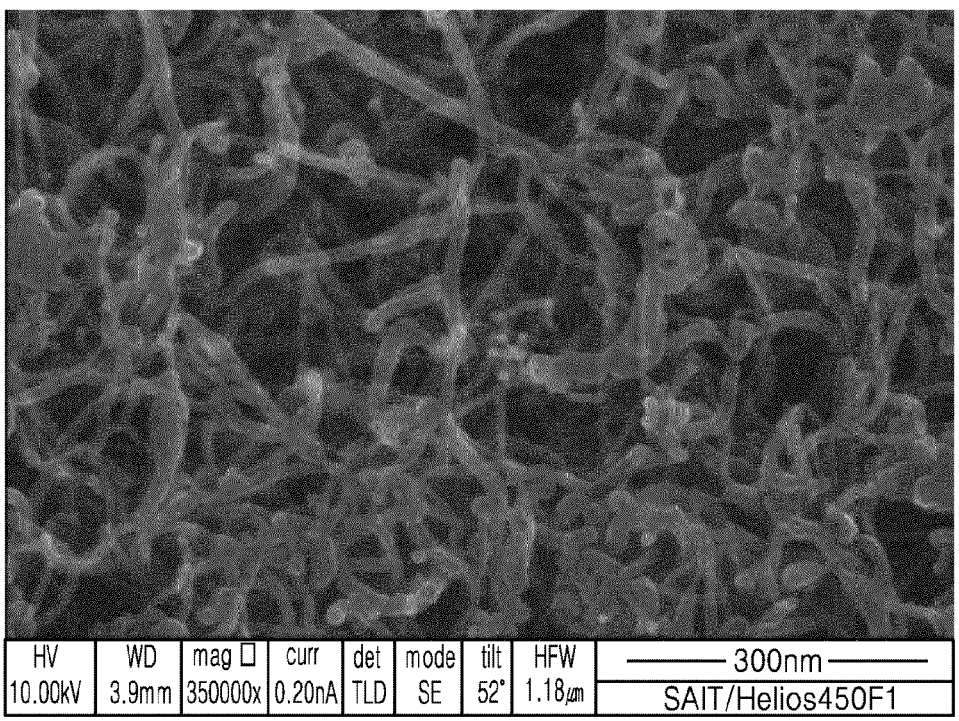

FIG. 1 is a schematic diagram of a conductive framework 10 having a spherical skein shape according to an embodiment. FIGS. 2A to 2C are scanning electron microscope (SEM) images of the conductive framework 10 having a spherical skein shape.

The conductive framework 10 may have a particle diameter of about 0.1 to about 100 µm, for example, about 1 to about 90 µm, for example, about 5 to about 80 µm, for example, about 10 to about 70 µm, for example, about 20 to about 60 µm, for example, about 30 to about 50 µm, and for example, about 35 to about 45 µm.

The conductive material forming the conductive framework 10 or included in the conductive framework 10 may have an average diameter of about 0.5 to about 1,000 nanometers (nm), for example, about 0.5 to about 100 nm, for example, about 10 to about 80 nm, for example, about 10 to about 50 nm, for example, about 20 to about 70 nm, for example, about 30 to about 60 nm, and for example, about 40 to about 50 nm.

The conductive material may have an average aspect ratio of 10 or greater, for example, 20 or greater, for example, 30 or greater, for example, 40 or greater, for example, 50 or greater, for example, 60 or greater, for example, 70 or greater, for example, 80 or greater, for example, 90 or greater, and for example, 100 or greater, and may have an aspect ratio of about 10 to about 10,000, about 50 to about 8000, or about 100 to about 5000. When the average aspect ratio of the conductive materials is 10 or greater, contacts among lengths of the conductive material may be suitably maintained, and thus the conductive framework having a spherical skein shape may efficiently be formed without having non-contact or dead regions.

As used herein, the term "aspect ratio" refers to a ratio of a major axis to a minor axis of each conductive material.

The conductive material may include a carbon nanotube, a carbon nanofiber, a conductive metal, a conductive polymer, or a combination thereof.

The complex for anode active material may further include an additional conductive material in the conductive framework.

The additional conductive material may include a carbon nanotube, a carbon nanofiber, a conductive metal, a conductive polymer, or a combination thereof.

In addition, the conductive material of the conductive framework and the additional conductive material may be the same or different, and the shapes thereof are not limited. For example, they may be in a fibrous, particle, plate, flake, tubular, or wire form.

The conductive metal may comprise copper, aluminum, iron, zinc, silver, palladium, nickel, titanium, gold, platinum, or a combination thereof. However, the conductive material is not limited thereto, and the conductive material may also include various other conductive metals.

The conductive polymer may comprise a polythiophene, a polyacetylene, a poly(paraphenylene), a polyaniline, a poly(paraphenylene vinylene), a polypyrrole, or a combination thereof, which is inclusive of a polythiophene-based polymer, a polyacetylene-based polymer, a poly(paraphenylene)-based polymer, a polyaniline-based polymer, a poly(paraphenylene vinylene)-based polymer, a polypyrrole-based polymer, or a combination thereof. However, the present disclosure is not limited thereto, and the conductive material may also include various other conductive polymers.

The complex may have a bulk density of about 0.1 to about 2.3 grams per cubic centimeter (g/cm$^3$), about 0.5 to about 2.0 g/cm$^3$, or about 1 to about 1.8 g/cm$^3$.

As used herein, the term "bulk density" refers to a value obtained by dividing a mass of the complex by a volume of the complex.

The complex may have a porosity of about 10% to about 85%, about 15% to about 80%, or about 20% to about 75%.

As used herein, the term "porosity" refers to a value obtained by dividing a total pore volume of the complex by an apparent volume of the complex.

When the bulk density and the porosity of the complex are within these ranges, e.g., bulk density in the range of about 0.1 to about 2.3 g/cm$^3$ and porosity in the range of about 10% to about 85%, in a battery using an anode including the complex, the volume expansion of the metal particles may be reduced within the conductive framework during charging and discharging. Thus, a volume expansion ratio of the electrode and lifespan deterioration of the anode caused thereby may be reduced.

The complex may have a root mean square (RMS) surface roughness of about 0.1 to about 100 nm, about 0.5 to about 90 nm, or about 1 to about 80 nm.

The metal particles may comprise silicon (Si), germanium (Ge), tin (Sn), lead (Pb), antimony (Sb), bismuth (Bi), zinc (Zn), aluminum (Al), titanium (Ti), nickel (Ni), cobalt (Co), cadmium (Cd), or a combination thereof; an alloy thereof; an oxide thereof; a carbide thereof; a nitride thereof; a sulfide thereof; a phosphide thereof; or a combination thereof.

The complex may further include a protective shell surrounding the conductive framework. The protective shell may allow lithium ions to pass therethrough while preventing passage of an electrolyte. Thus, in a battery using an anode including the complex, the protective shell may prevent or suppress direct contact between the metal particles and an electrolyte and reduce formation of a solid electrolyte interphase (SEI) layer.

In addition, the protective shell may improve a shape retaining force of the complex, thereby assisting the complex to not to expand despite expansion of the metal particles.

Meanwhile, in general, a binder used in an anode and an electrolyte used in a battery including the anode need to be changed in accordance with the change of an anode active material. That is, binders and electrolytes suitable for particular anode active materials need to be used. Thus, when a complex with no protective shell or a complex including a protective shell having a material incompatible with a conventional anode active material are used as an anode active material, one binder and one electrolyte suitable for a conventional anode active material (e.g., graphite) need to be replaced with another binder and another electrolyte suitable for the complex. However, when a complex including a protective shell having a material compatible with the conventional anode active material is used as an anode active material, the binder and the electrolyte may not be changed. In other words, a suitable binder and a suitable electrolyte, which are compatible with an anode active material, are desirably used. That is, a binder and an electrolyte suitable for the anode active material should to be used. Because a complex including a protective shell may have improved compatibility, e.g., be compatible with other materials which may be included in the anode active material, the binder and the electrolyte used in a battery comprising the complex including the protective shell may be the same as is used in a battery having a different anode active material.

The protective shell may comprise a carbonaceous material, an oxide material, a fluoride material, a lithium ion solid electrolyte material, an ionic conductive polymer material, or a combination thereof.

The protective shell may have a thickness of about 0.01 to about 10 μm, for example, about 0.5 to about 9 μm, for example, about 1 to about 8 μm, for example, about 1.5 to about 7 μm, for example, about 2 to about 6 μm, for example, about 2.5 to about 5 μm, and for example, about 3 to about 4 μm.

The carbonaceous material may include a hard carbon, which is an amorphous carbonaceous material obtained by pyrolyzing various organic materials including a phenol resin or furan resin; a soft carbon, which is an amorphous carbonaceous material obtained by carbonizing cokes, needle cokes, coal tar pitch, petroleum pitch or heavy oil; graphene; graphite sheet; or a combination thereof.

As used herein, the term "pitch" is a generic term of black solid carbonaceous residues obtained by distilling tar that is produced during dry distillation of coal, wood, or other organic materials and refers to a type of bitumen.

As used herein, the term "cokes" refers to single lumps of a carbonaceous material produced during high-temperature dry distillation of coal, wood, or other organic materials.

The oxide material may comprise aluminum oxide, titanium oxide, zinc oxide, iron oxide, zirconium oxide, cerium oxide, tin oxide, silicon oxide, magnesium oxide, or a combination thereof.

The fluoride material may include aluminum fluoride, lithium fluoride, iron fluoride, or a combination thereof.

The lithium ion solid electrolyte material may comprise a sulfur-based amorphous electrolyte including $Li_2S-P_2O_5$, a NASICON structured material including $Li_{1+x+y}Al_xTi_{2-x}Si_yP_{3-y}O_{12}$ (wherein x=0.3 and y=0.2), a garnet structured material including $Li_7La_3Zr_2O_{12}$, a germanium-phosphorus-sulfur compound including $Li_{10}GeP_2S_{12}$, or a combination thereof.

The ionic conductive polymer material may comprise polyethyleneoxide (PEO), polypropyleneoxide (PPO), polyethylene glycol (PEG), polyacrylonitrile (PAN), polymethacrylic acid ester, polyvinylidene fluoride (PVdF), poly(vinylidene fluoride-hexafluoropropylene) copolymer (PVdF-HFP), poly(methyl acrylate) (PMA), poly(methyl methacrylate) (PMMA), a combination thereof, or a modified product thereof, a derivative thereof, a random copolymer thereof, an alternating copolymer thereof, a graft copolymer thereof, a block copolymer thereof, or a combination thereof.

The complex may include about 10 to about 90 parts by weight, about 15 to about 85 parts by weight, or about 20 to about 80 parts by weight of the metal particles, based on 100 parts by weight of the conductive framework 10. When the content of the metal particles is within this range the anode may have sufficiently high capacity and the complex may have pores sufficient for accommodating expansion of metal particles therein.

The complex may have a spherical shape.

Figure 3:
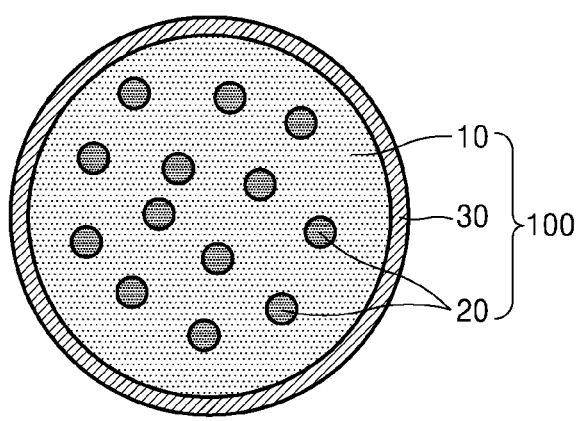
FIG. 3 is a schematic diagram of a complex for anode active material according to an embodiment.

FIG. 3 is a schematic diagram of a complex for anode active material 100 according to an embodiment.

Referring to FIG. 3, the complex for anode active material 100 includes a conductive framework 10, metal particles 20 dispersed in the conductive framework 10, and a protective shell 30 surrounding the conductive framework 10.

Hereinafter, a method of preparing a complex for anode active material, according to an embodiment, will be described in detail.

The method of preparing a complex for anode active material includes preparing a dispersion by dispersing a conductive material having a fibrous shape and metal particles in a medium; preparing a pre-complex including a framework, e.g., a conductive framework or network, formed of the conductive material and the metal particles dispersed therein from the dispersion; and preparing a complex including the conductive framework having a spherical skein shape and the metal particles dispersed therein by applying a shearing force to the pre-complex.

For example, a method of preparing a complex for anode active material comprises combining a fibrous conductive material and metal particles in a medium to form a dispersion; agitating the dispersion to form a pre-complex comprising a framework formed of the conductive material and the metal particles dispersed therein; and applying a shearing force to the pre-complex to form the complex, wherein the complex comprises a conductive framework having a spherical skein shape, and the metal particles dispersed therein.

The medium may include alcohol (e.g., ethanol), acetone, water, N-methyl-2-pyrrolidone (NMP), toluene, tetrahydrofuran (THF), hexane, or a combination thereof.

The method may further include forming a protective shell on the surface of the complex by applying a protective shell-forming material on the surface of the complex.

Hereinafter, a method of forming a protective shell on the spherical complex will be further described.

For example, the protective shell may be formed on the surface of the complex by preparing a mixture by mixing the complex with the protective shell-forming material, adding the mixture to a mixer having sufficient shear, e.g., a bladed hybridization system, such as that which is commercially available from Nara machinery Co., Ltd., model NHS-0, and applying a shearing force to the mixture by rotating the blades at a predetermined speed, for example, 100 rpm to 20,000 rpm. Alternatively, an ultrasonic mixer may be used.

Alternatively, the protective shell may be formed by mixing the complex with the protective shell-forming material and milling the mixture using a ball mill.

Alternatively, the protective shell surrounding the spherical complex may be formed by further adding the protective shell-forming material to the dispersion in the preparing of the dispersion.

Alternatively, the protective shell surrounding the spherical complex may be formed by wet-mixing the complex with the protective shell-forming material and drying the mixture. Particularly, the protective shell surrounding the spherical complex may be formed by dissolving the protective shell-forming material in a first solvent to prepare a solution, mixing the solution with the spherical complex, and drying the resultant mixture.

The protective shell-forming material may be a material included in the protective shell of the spherical complex.

The first solvent may include a C1 to C6 alcohol (e.g., ethanol), acetone, water, NMP, toluene, THF, hexane, or a combination thereof.

Hereinafter, an anode according to an embodiment will be described in further detail.

The anode includes the complex described above.

The anode may further include an additional anode active material in addition to the complex.

The additional anode active material may comprise any suitable material used in the art as anode active material for a secondary battery. Examples of the additional anode active material may include lithium metal, a metal alloyable with lithium, a transition metal oxide, a non-transition metal oxide, and a material that allows doping or undoping of lithium, a carbonaceous material, or a combination thereof. Although lithium secondary batteries are described above as secondary batteries, the present disclosure is not limited thereto. Also, other secondary batteries, for example, magnesium secondary batteries may be used.

The metal or metalloid alloyable with lithium may comprise Si, Sn, Al, In, Ge, Pb, Bi, Sb, a Si–Y' alloy (Y' is alkali metal, alkaline earth metal, Group 13 elements, Group 14 elements, Group 15 elements, Group 16 elements, transition metal, rare earth elements, or a combination thereof (except for Si)), a Sn–Y" alloy (Y" is alkali metal, alkaline earth metal, Group XIII elements, Group XIV elements, transition metal, rare earth elements, or a combination thereof (except for Sn)), and the like. In this regard, Y' and Y" may each independently be Mg, Ca, Sr, Ba, Ra, Sc, Y, Ti, Zr, Hf, Rf, V, Nb, Ta, Db, Cr, Mo, W, Sg, Tc, Re, Bh, Fe, Pb, Ru, Os, Hs, Rh, Ir, Pd, Pt, Cu, Ag, Au, Zn, Cd, B, Al, Ga, Sn, In, Tl, Ge, P, As, Sb, Bi, S, Se, Te, Po, or an combination thereof.

Examples of the transition metal oxide include tungsten oxide, molybdenum oxide, titanium oxide, lithium titanium oxide, vanadium oxide, lithium vanadium oxide, or a combination thereof.

The non-transition metal oxide may be, for example, $SnO_2$, $SiO_x$ ($0<x<2$), and the like.

The material that allows doping and undoping of lithium may be, for example, Sn, $SnO_2$, and Sn—Y' alloy (where Y' is alkali metal, alkaline earth metal, Group 11 elements, Group 12 elements, Group 13 elements, Group 14 elements, Group 15 elements, Group 16 elements, transition metal, rare earth elements, or a combination thereof (except for Sn)). In this regard, Y' may be Mg, Ca, Sr, Ba, Ra, Sc, Y, Ti, Zr, Hf, Rf, V, Nb, Ta, Db, Cr, Mo, W, Sg, Tc, Re, Bh, Fe, Pb, Ru, Os, Hs, Rh, Ir, Pd, Pt, Cu, Ag, Au, Zn, Cd, B, Al, Ga, Sn, In, Tl, Ge, P, As, Sb, Bi, S, Se, Te, Po, or a combination thereof.

The carbonaceous material may include crystalline carbon, amorphous carbon, or a combination thereof. Examples of the carbonaceous material may include natural graphite, artificial graphite, graphite carbon fiber, resin-sintered carbon, carbon grown by vapor-phase thermal decomposition, cokes, mesophase carbon microbeads (MCMBs), furfuryl alcohol resin-sintered carbon, pitch-based carbon fibers (PCF), vapor grown carbon fiber, soft carbon (low temperature sintered carbon) or hard carbon, and mesophase pitch carbonization products. They may be used alone or in a combination thereof as the additional anode active material.

The carbonaceous material may be non-shaped, in a plate, flake, spherical or fibrous form, or a combination thereof.

The anode may further include a binder and/or a conductive agent in addition to the complex and the additional anode active material.

The binder may assist binding among constituent components such as the complex, the additional anode active material, and the conductive agent and binding of the anode to a current collector. Examples of the binder may include polyacrylic acid (PAA), polyvinylidene fluoride, polyvinyl alcohol, carboxymethyl cellulose (CMC), starch, hydroxypropyl cellulose, regenerated cellulose, polyvinylpyrrolidone, polytetrafluoroethylene, polyethylene, polypropylene, ethylene-propylene-diene monomer (EPDM), sulfonated EPDM, styrene butadiene rubber, fluoro rubber, and various copolymers, or a combination thereof.

The binder may include lithium ions.

A content of the binder may be in the range of about 1 to about 20 parts by weight, for example, about 2 to about 7 parts by weight, based on 100 parts by weight of a total weight of the complex and the additional anode active material. When the content of the binder is within this range (about 1 to about 20 parts by weight), adhesion of the anode to the current collector may increase.

The conductive agent may be any suitable conductive material that does not cause any chemical change in a lithium secondary battery including the conductive agent.

Examples of the conductive agent may include a carbonaceous conductive agent and may comprise carbon black, carbon fiber, graphite, or a combination thereof, which is the same as or different from the graphite used as the additional anode active material. The carbon black may be acetylene black, Ketjen black, super-P, channel black, furnace black, lamp black, thermal black, or a combination thereof. The graphite may include natural graphite, artificial graphite, or a combination thereof.

The anode may further include an additional conductive agent in addition to the aforementioned carbonaceous conductive agent.

The additional conductive agent may be a conductive fiber such as metal fiber; carbon fluoride powder; metal powder such as, aluminum powder, nickel powder, or a combination thereof; a conductive whisker such as zinc oxide or potassium titanate; or a polyphenylene derivative. A combination comprising at least two of the foregoing may be used.

A content of the conductive agent may be in the range of about 0.01 to about 10 parts by weight, for example, about 0.5 to about 5 parts by weight based on 100 parts by weight of a total weight of the complex and the additional anode active material. When the content of the conductive agent is within this range (about 0.01 to about 10 parts by weight), the anode may have improved ionic conductivity.

The anode may be prepared in the following manner.

First, the complex according to an embodiment, the additional anode active material, the binder, a second solvent, the carbonaceous conductive agent, and/or the additional conductive agent are mixed together to prepare an anode active material layer-forming composition.

Then, the anode active material layer-forming composition is applied on an anode current collector and dried to prepare an anode.

The anode current collector may have a thickness of about 3 to about 500 µm. The anode current collector may comprise any suitable material for a current collector having conductivity without causing any undesirable chemical change in lithium secondary batteries including the same. Examples of the anode current collector may include: copper; stainless steel; aluminum; nickel; titanium; heat-treated carbon; copper or stainless steel surface-treated with carbon, nickel, titanium, silver, or the like; an aluminum-cadmium alloy, or a combination thereof. In addition, the anode current collector may have a surface on which fine irregularities are formed to enhance adhesive strength to the anode active material in the same manner as a cathode current collector. The anode current collector may be used in any suitable forms including films, sheets, foils, nets, porous structures, foams, and non-woven fabrics.

The second solvent may be NMP, acetone, water, or a combination thereof. A content of the second solvent may be in the range of about 1 to about 500 parts by weight, based on 100 parts by weight of the anode active material. When the content of the second solvent is within this range, a process of forming the anode active material layer may be efficiently performed.

A lithium secondary battery according to an embodiment includes the anode described above.

The lithium secondary battery has excellent capacity and lifespan characteristics.

Hereinafter, a method of preparing a lithium secondary battery, according to an embodiment, will be described in further detail.

First, an anode is prepared according to the method as described above.

Then, a cathode is prepared in a similar method to that of the anode as described above. For example, a lithium transition metal oxide, a binder, a conductive agent, and a second solvent are mixed together to prepare a cathode active material layer-forming composition. Then, the cathode active material layer-forming composition is coated on a cathode current collector and dried to prepare a cathode.

Types and contents of the binder, the conductive agent, and the second solvent used in the cathode active material layer-forming composition may be the same as those used in the anode active material layer-forming composition.

The lithium transition metal oxide may comprise $LiCoO_2$, $LiNiO_2$, $LiMnO_2$, $LiMn_2O_4$, $Li(Ni_aCo_bMn_c)O_2$ (wherein $0<a<1$, $0<b<1$, $0<c<1$, and $a+b+c=1$), $LiNi_{1-y}CO_yO_2$, $LiCO_{1-y}Mn_yO_2$, $LiNi_{1-y}Mn_yO_2$ (wherein $0 \le y<1$), $LiMn_{2-z}Ni_zO_4$, $LiMn_{2-z}Co_zO_4$ (wherein $0<z<2$), $LiCoPO_4$, $LiFePO_4$, or a combination thereof.

The cathode current collector has a thickness of about 3 to about 500 µm and may any suitable current collector having suitable conductivity without causing any undesirable chemical change in the lithium secondary batteries including the same. Examples of the cathode current collector may include: stainless steel; aluminum; nickel; titanium; heat-treated carbon; or aluminum or stainless steel surface-treated with carbon, nickel, titanium, silver, or a combination thereof. The cathode current collector may have fine irregularities on the surface thereof to increase adhesion of the cathode active material and may be used in any suitable form including films, sheets, foils, nets, porous structures, foams, and non-woven fabrics.

A separator is interposed between the cathode and the anode, which are prepared as described above, and an organic liquid electrolyte is injected thereinto, thereby completing the manufacture of a lithium secondary battery.

For example, the lithium secondary battery may be prepared by sequentially stacking the anode, the separator, and the cathode, winding or folding the stacked structure, accommodating the wound or folded structure in a battery case or pouch, and injecting the organic liquid electrolyte thereinto.

The separator may have a pore diameter of about 0.01 to about 10 µm and a thickness of about 5 to about 300 µm. Examples of the separator may include an olefin-based polymer such as polypropylene and polyethylene or a sheet or non-woven fabric formed of glass fibers.

The organic liquid electrolyte may be prepared by dissolving a lithium salt in an organic solvent.

The organic solvent may comprise propylene carbonate, ethylene carbonate, fluoroethylene carbonate, butylene carbonate, dimethyl carbonate, diethyl carbonate, methyl ethyl carbonate, methyl propyl carbonate, ethyl propyl carbonate, methyl isopropyl carbonate, dipropyl carbonate, dibutyl carbonate, benzonitrile, acetonitrile, tetrahydrofuran, 2-methyltetrahydrofuran, γ-butyrolactone, dioxolane, 4-methyldioxolane, N,N-dimethylformamide, dimethylacetamide, dimethylsulfoxide, dioxane, 1,2-dimethoxyethane, sulfolane, dichloroethane, chlorobenzene, nitrobenzene, diethylene glycol, dimethyl ether, and a combination thereof.

The lithium salt may comprise $LiPF_6$, $LiBF_4$, $LiSbF_6$, $LiAsF_6$, $LiClO_4$, $LiCF_3SO_3$, $Li(CF_3SO_2)_2N$, $LiC_4F_9SO_3$, $LiAlO_2$, $LiAlCl_4$, $LiN(C_xF_{2x+1}SO_2)(C_yF_{2y+1}SO_2)$ (wherein x and y are each independently a natural number), LiCl, LiI, and a combination thereof.

A lithium secondary battery according to another embodiment may further include an organic solid electrolyte and/or an inorganic solid electrolyte in addition to the organic liquid electrolyte. When the organic solid electrolyte and/or the inorganic solid electrolyte are used, each solid electrolyte may also serve as a separator, and thus a separator may not be used.

Examples of the organic solid electrolyte may include a polyethylene derivative, a polyethylene oxide derivative, a polypropylene oxide derivative, a phosphoric acid ester polymer, polyvinyl alcohol, polyvinylidene fluoride, or a combination thereof.

Examples of the inorganic solid electrolyte may include $Li_4SiO_4$; a nitride, halide, or sulfide of Li such as $Li_3N$, LiI, $Li_5NI_2$, $Li_3N$—LiI—LiOH, $Li_2SiS_3$, $Li_4SiO_4$—LiI—LiOH, $Li_3PO_4$—$Li_2S$—$SiS_2$, or a combination thereof.

Hereinafter, an embodiment is disclosed in further detail with reference to the following examples. These examples shall not limit the purpose and scope of the disclosed embodiments.

EXAMPLES

Example 1

Preparation of Complex, Anode, and Coin Half Cell (Preparation of Complex With No Protective Shell)

0.7 parts by weight of carbon nanotubes (CNT Co., Ltd., CTube-120, having a diameter of about 10 nm to about 50 nm and an average diameter of 30 nm) and 0.3 parts by weight of silicon nanoparticles (SiNP, CN Vision Co., Ltd., Silicon nanopowder) were added to 99 parts by weight of acetone to prepare a mixture. Then, the mixture was ultra-sonicated to prepare a carbon nanotube framework in which silicon nanoparticles are dispersed, and the carbon nanotube framework was added to a hybridization system provided with blades (Nara machinery Co., Ltd., NHS-0). The blades were rotated at a speed of 10,000 rpm to prepare a spherical complex with no protective shell.

(Preparation of Anode)

20 parts by weight of the complex, 20 parts by weight of first graphite (SFG6, TIMCAL), 52 parts by weight of second graphite (Mitsubishi Chemical Corporation, MC20), and 8 parts by weight of a binder solution (4 vol% of Li-PAA solution prepared by dissolving PAA (Aldrich, Polyacrylic acid) and Li ions in water) were mixed together to prepare an anode active material layer-forming composition. Then, the anode active material layer-forming composition was coated on a copper thin film, used as an anode current collector, to have a thickness of 100 μm, and the structure was primarily dried at 80° C., secondarily dried at 120° C. in a vacuum, and roll-pressed to prepare an anode.

(Preparation of Coin Half Cell)

A 2032 type coin half cell was prepared by winding the anode to a cylindrical shape having a diameter of 12 mm and using lithium metal as a counter electrode. Here, 1.1 M $LiPF_6$ and 0.2 M $LiBF_4$ solution, prepared using a mixed solvent including ethylene carbonate, diethyl carbonate, and fluoroethylene carbonate in a weight ratio of 2:6:2, were used as organic liquid electrolytes. Also, Star20 separator from Asahi Kasei was used as a separator.

Example 2

Preparation of Complex, Anode, and Coin Half Cell (Preparation of Complex Having Protective Shell)

The spherical complex with no protective shell prepared according to Example 1 and a large amount of graphite sheets (NF10, AOYU Graphite Group Corp.) were added to the hybridization system (Nara machinery Co., Ltd., NHS-0), and the blades were rotated at a speed of 10,000 rpm to prepare a spherical complex having a protective shell. A weight ratio of the graphite sheet to the complex was 2:8.

(Preparation of Anode and Coin Half Cell)

An anode and a coin half cell were prepared in the same manner as in Example 1, except that the spherical complex having the protective shell prepared according to Example 2 was used instead of the spherical complex with no protective shell prepared according to Example 1.

Comparative Example 1

Preparation of Complex, Anode, and Coin Half Cell (Preparation of Complex)

0.7 parts by weight of carbon nanotubes (CNT Co., Ltd., CTube-120) and 0.3 parts by weight of silicon nanoparticles (SiNP, CN Vision Co., Ltd., Silicon nanopowder) were added to 99 parts by weight of acetone to prepare a mixture. Then, the mixture was milled in a ball mill (Spex) to prepare a complex.

(Preparation of Anode and Coin Half Cell)

An anode and a coin half cell were prepared in the same manner as in Example 1, except that the complex prepared according to Comparative Example 1 was used instead of the spherical complex with no protective shell prepared according to Example 1.

Evaluation Examples

Evaluation Example 1

SEM image Analysis of Spherical Complex With No Protective Shell

Figure 4A:
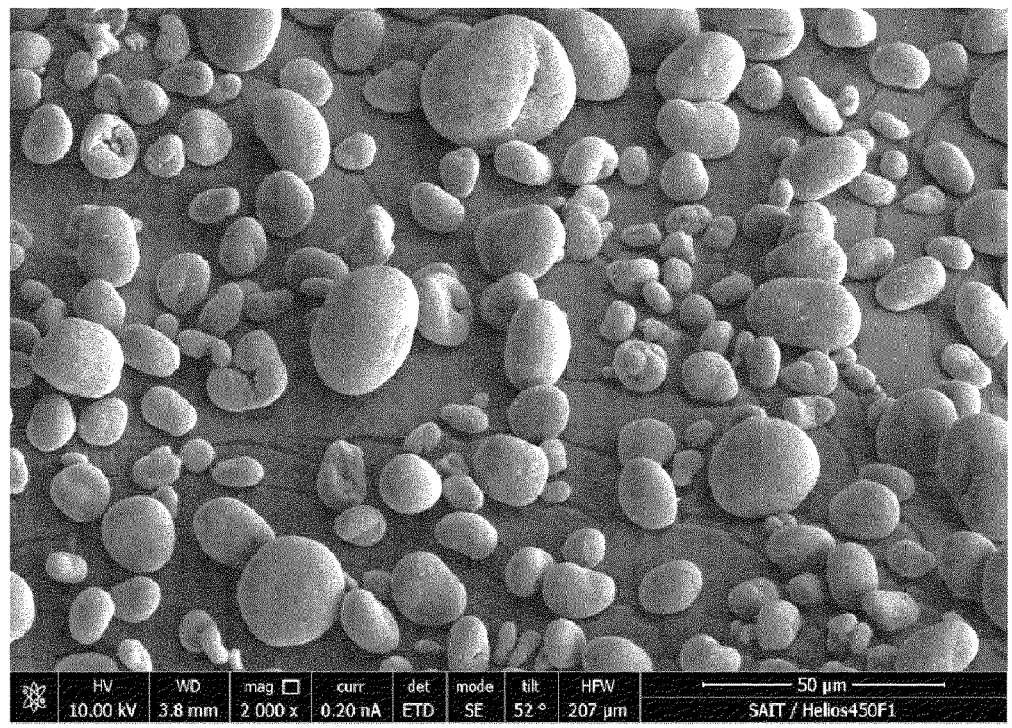
FIGS. 4A to 4C are SEM images of a complex for anode active material prepared according to Example 1.
Figure 4B:
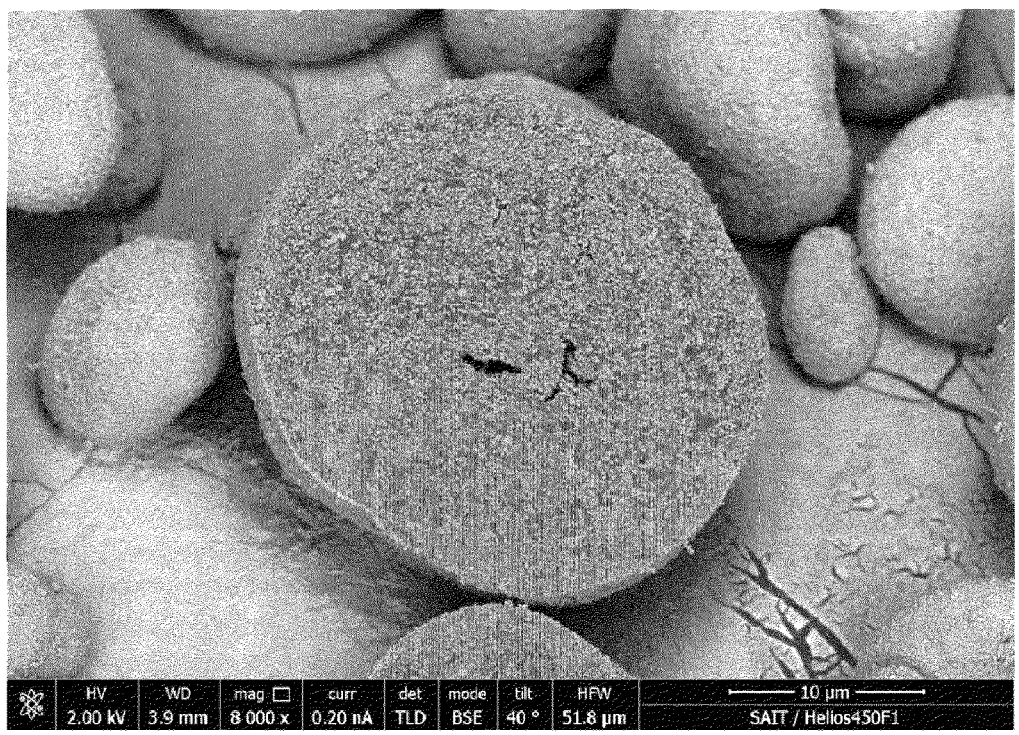
Figure 4C:
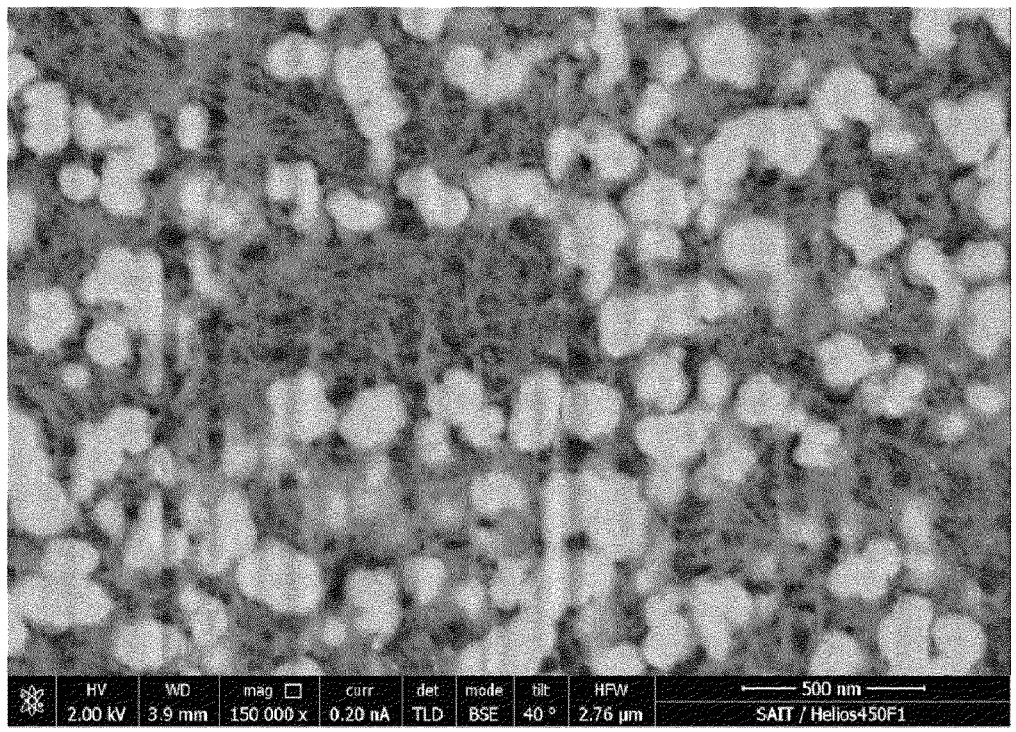

SEM images of the spherical complex with no protective shell, prepared according to Example 1, were acquired using an SEM-FIB device (FEI, Helios 450F1) and shown in FIGS. 4A to 4C. FIG. 4A illustrates the uncut complex. FIG. 4B illustrates cross-sections of the complex cut by the FIB device. FIG. 4C is an enlarged view of FIG. 4B. In FIGS. 4B and 4C, black portions correspond to carbon nanotubes, and white portions correspond to silicon (Si) particles.

Referring to FIGS. 4A to 4C, it was confirmed that the complex prepared according to Example 1 was a spherical complex in which silicon particles are uniformly dispersed in a carbon nanotube framework having a skein shape.

Evaluation Example 2

XRD Pattern Analysis of Spherical Complex With No Protective Shell

Figure 5:
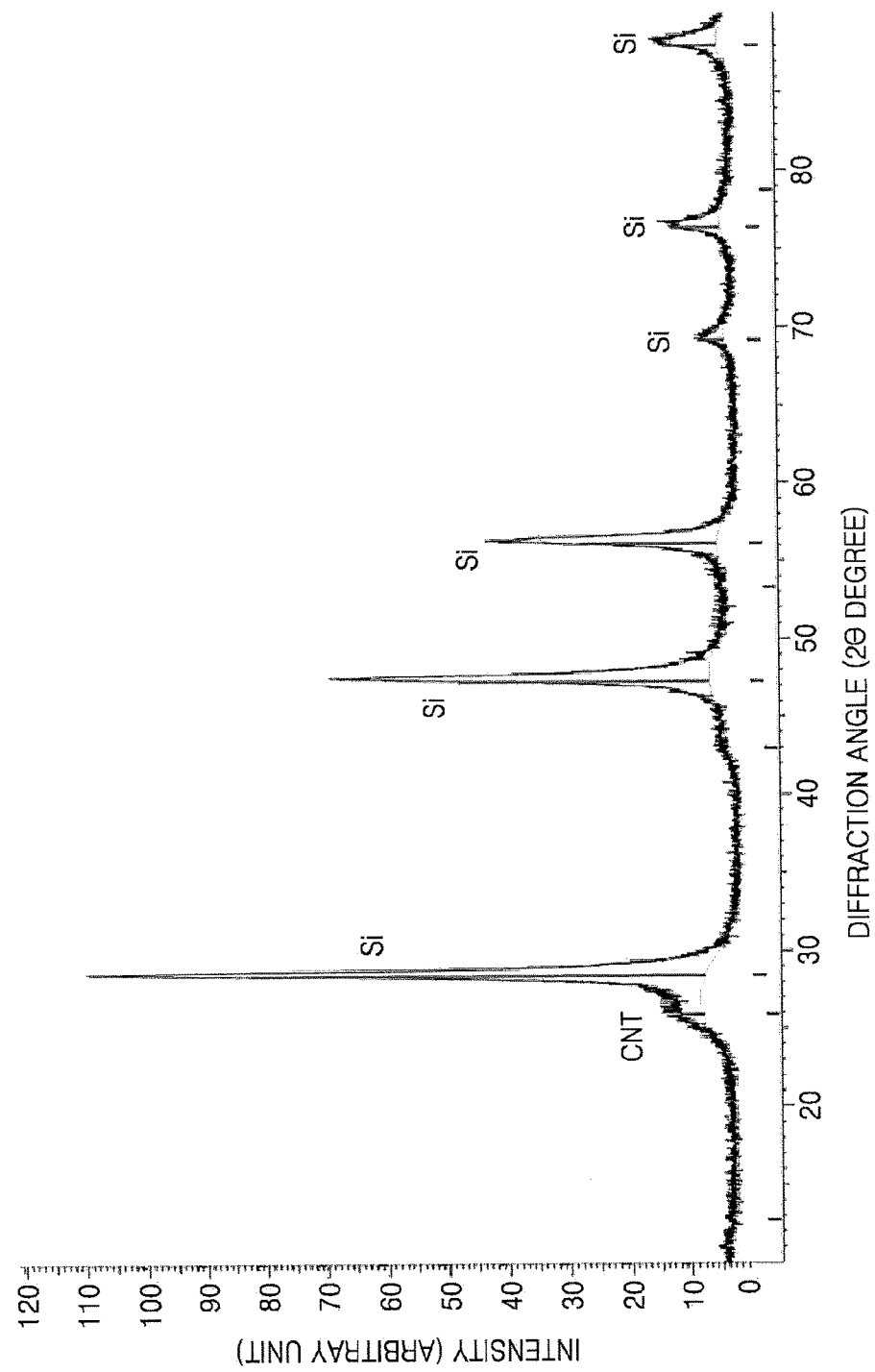
FIG. 5 is a graph of intensity (arbitrary units) versus diffraction angle (two-theta, 2θ) and is an X-ray diffraction (XRD) spectrum of the complex for anode active material prepared according to Example 1.

An XRD pattern of the spherical complex prepared according to Example 1 was analyzed using an X-ray diffractometer (Rigaku RINT2200HF+ diffractometer using Cu Kα radiation (1.540598Å)), and the results are shown in FIG. 5.

Referring to FIG. 5, the spherical complex includes carbon nanotubes (CNTs) and silicon (Si)

Evaluation Example 3

Comparison of SEM Images of Complexes With No Protective Shell

Figure 6:
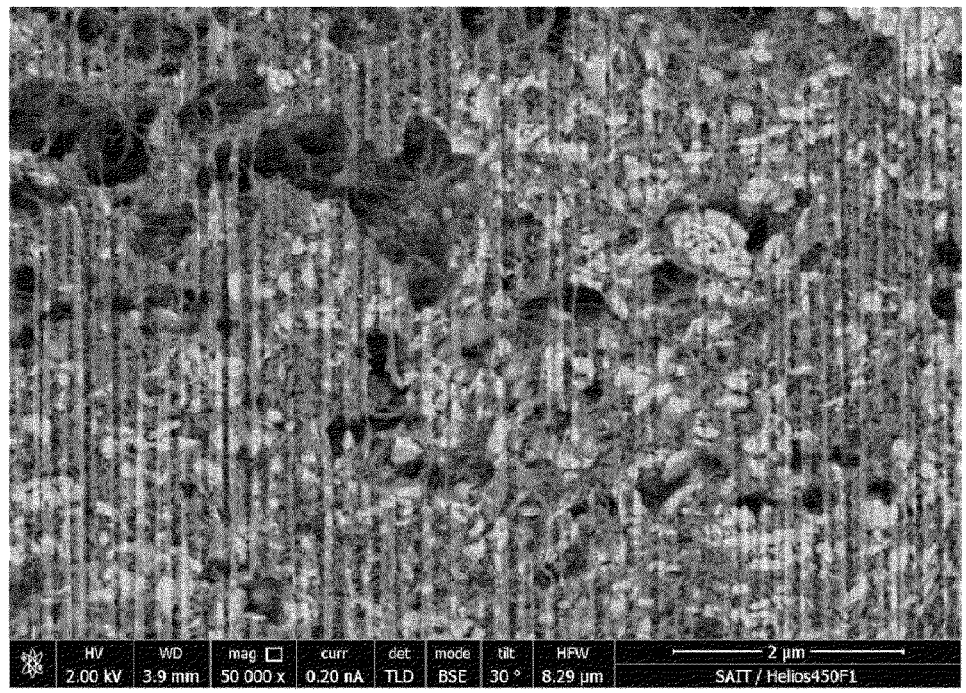
FIG. 6 is an SEM image of the complex for anode active material prepared according to Example 1.
Figure 7:
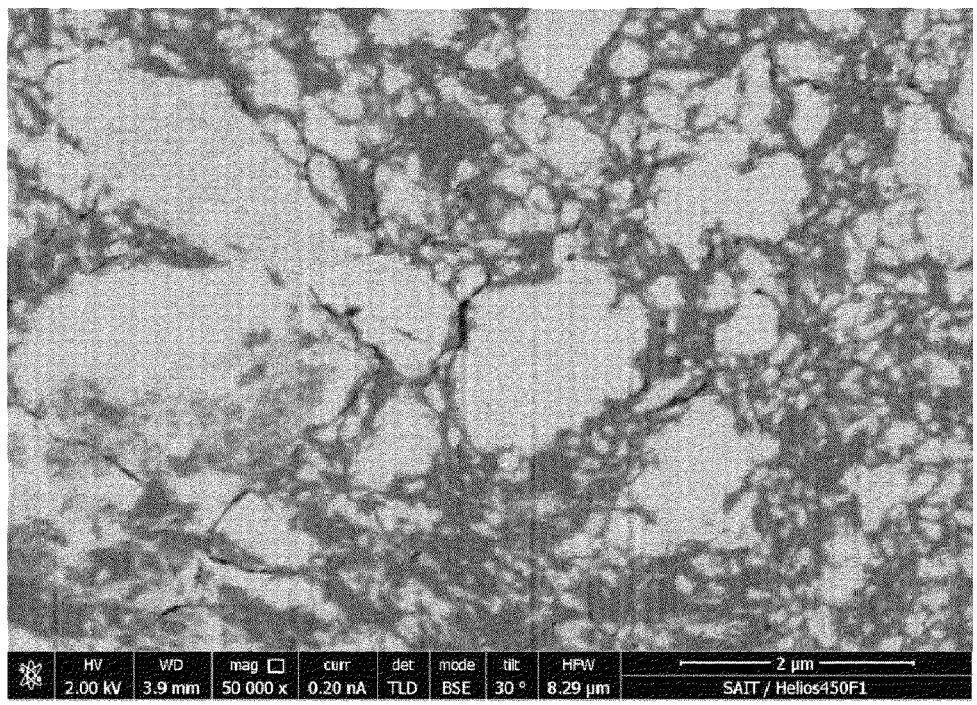
FIG. 7 is an SEM image of a complex for anode active material prepared according to Comparative Example 1.

SEM images of the complexes respectively prepared according to Example 1 and Comparative Example 1 were acquired using the SEM-FIB device (FEI, Helios 450F1) and shown in FIGS. 6 and 7, respectively. FIG. 6 illustrates cross-sections of the complex prepared according to Example 1 cut by the FIB device. FIG. 7 illustrates cross-sections of the complex prepared according to Comparative Example 1 cut by the FIB device.

Referring to FIGS. 6 and 7, the complex prepared according to Example 1 has a larger inner space, less breakings of the carbon nanotubes, and less agglomeration of silicon particles, compared to the complex prepared according to Comparative Example 1. Thus, the complex prepared according to Example 1 has a lower volume expansion ratio and better lifespan characteristics during charging and discharging, compared to the complex prepared according to Comparative Example 1.

Evaluation Example 4

SEM Image Analysis of Spherical Complex Having Protective Shell

Figure 8A:
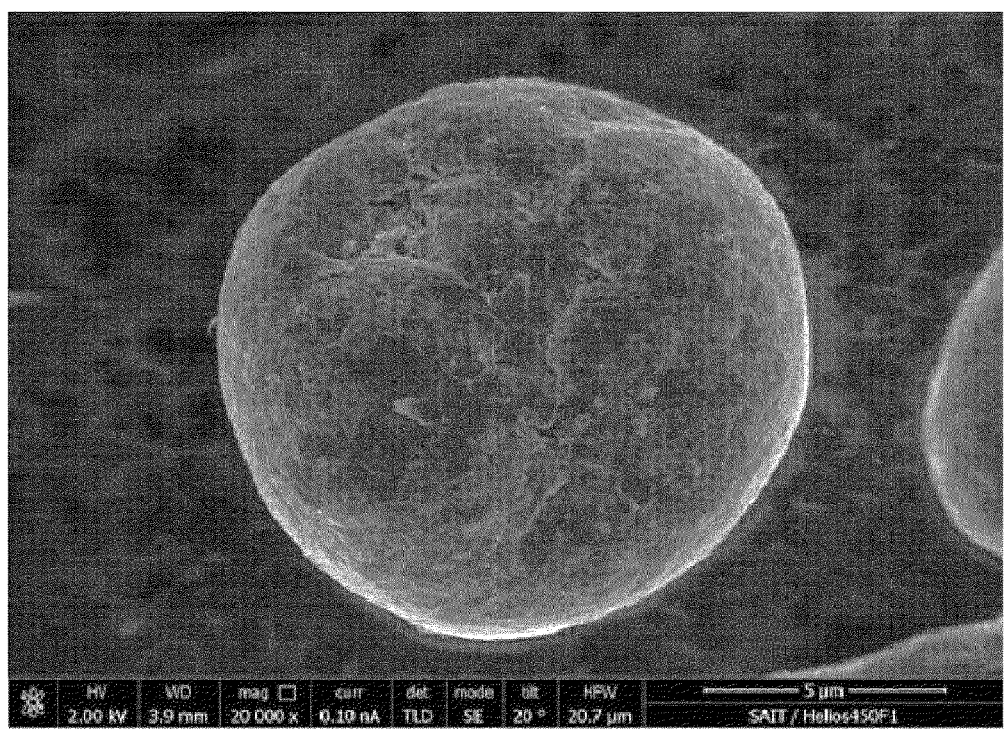
FIGS. 8A and 8B are SEM images of a complex for anode active material prepared according to Example 2.
Figure 8B:
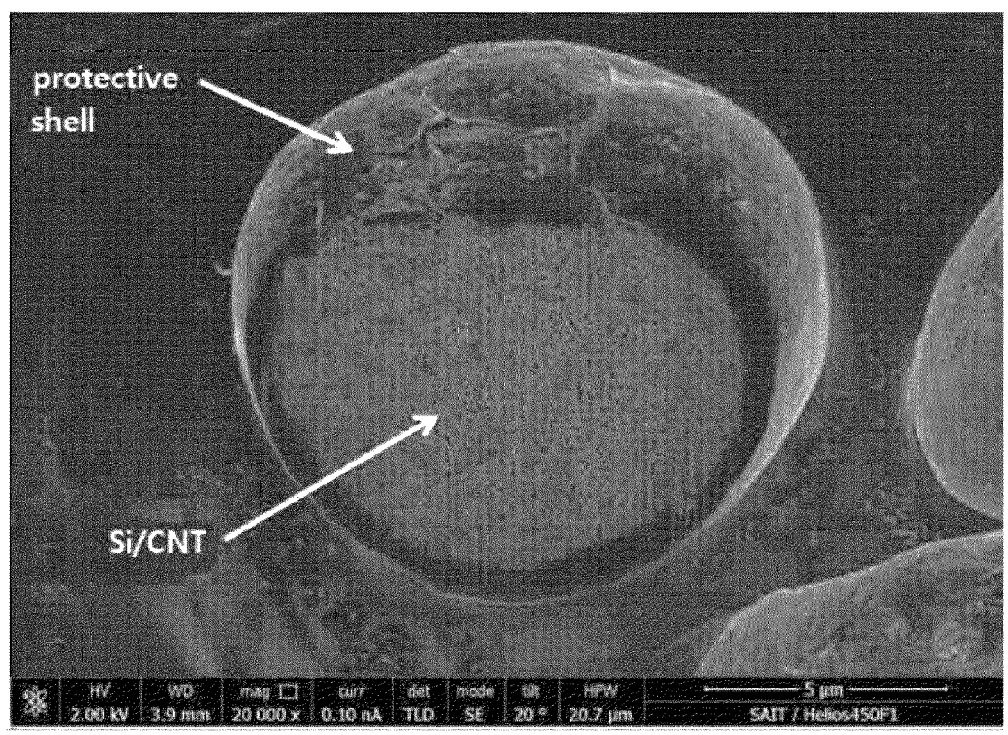

SEM images of the spherical complex having a protective shell prepared according to Example 2 were acquired using the SEM-FIB device (FEI, Helios 450F1) and shown in FIGS. 8A and 8B. FIG. 8A illustrates the uncut complex. FIG. 8B illustrates a cross-section of the complex cut by the FIB device.

Referring to FIGS. 8A and 8B, it was confirmed that the complex prepared according to Example 2 has a spherical core in which carbon nanotubes (CNTs) and silicon (Si) particles are uniformly dispersed (i.e., Si/CNT), and the core is uniformly covered with a protective shell formed of a graphite sheet.

Evaluation Example 5

Evaluation of Charge/Discharge Characteristics

Charge/discharge characteristics of the coin half cells respectively prepared according to Examples 1 and 2 and Comparative Example 1 were evaluated using a charger/discharger (TOYO-3100 manufacture by TOYO). Particularly, each of the coin half cells was charged at a C-rate of 0.1 C (unit mA/g) at room temperature (25° C.) at a first cycle (n=1) until a voltage reached 0.01 V and discharged at a C-rate of 0.1 C until the voltage reached 1.5 V. Then, the coin half cell was rested for 10 minutes. Subsequently, at a second cycle and following cycles (n≥2), each of the coin half cells was charged at a C-rate of 1.0 C at room temperature (25° C.) until a voltage reached 0.01 V and discharged at a C-rate of 1.0 C until the voltage reached 1.5 V. The charge/discharge cycle was repeated 100 times in total (i.e., n=100). Here, a C rate is a discharge rate of a cell, obtained by dividing a total capacity of a cell by a total discharge time. Two coin half cells were respectively prepared according to Examples 1 and 2 and Comparative Example 1 and charge/discharge characteristics thereof were evaluated.

Evaluation of Voltage Profile

Figure 9:
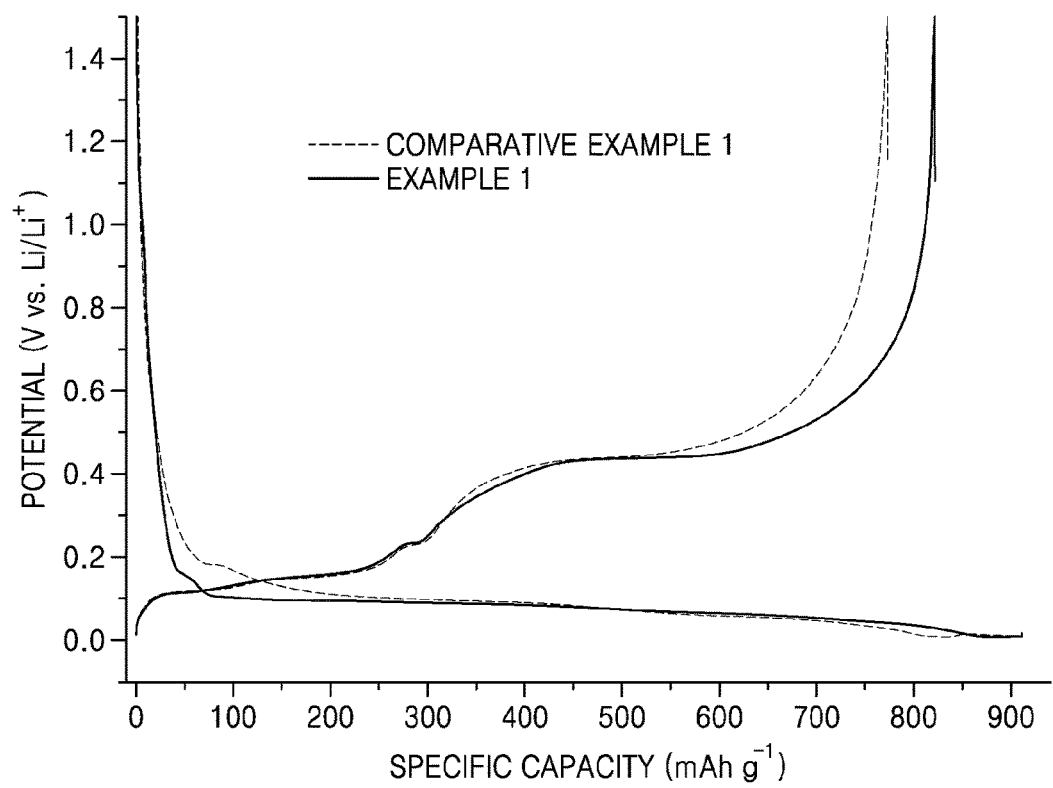
FIG. 9 is a graph of potential (Volts versus $Li/Li^+$) versus specific capacity (milliampere hours per gram, $mAh{\sim}g^{-1}$) illustrating first charge/discharge curves of anodes prepared according to Example 1 and Comparative Example 1.

Voltage profiles of coin half cells respectively prepared according to Example 1 and Comparative Example 1 with respect to the number of cycles are shown in FIG. 9.

Referring to FIG. 9, the coin half cell prepared according to Example 1 has better initial discharge capacity characteristics than the coin half cell prepared according to Comparative Example 1.

In addition, initial discharge capacity and initial charge/discharge efficiency of the coin half cells respectively prepared according to Example 1 and Comparative Example 1 were evaluated, and the results are shown in Table 1 below.

Comparison of Cycle Lifespan

Figure 10:
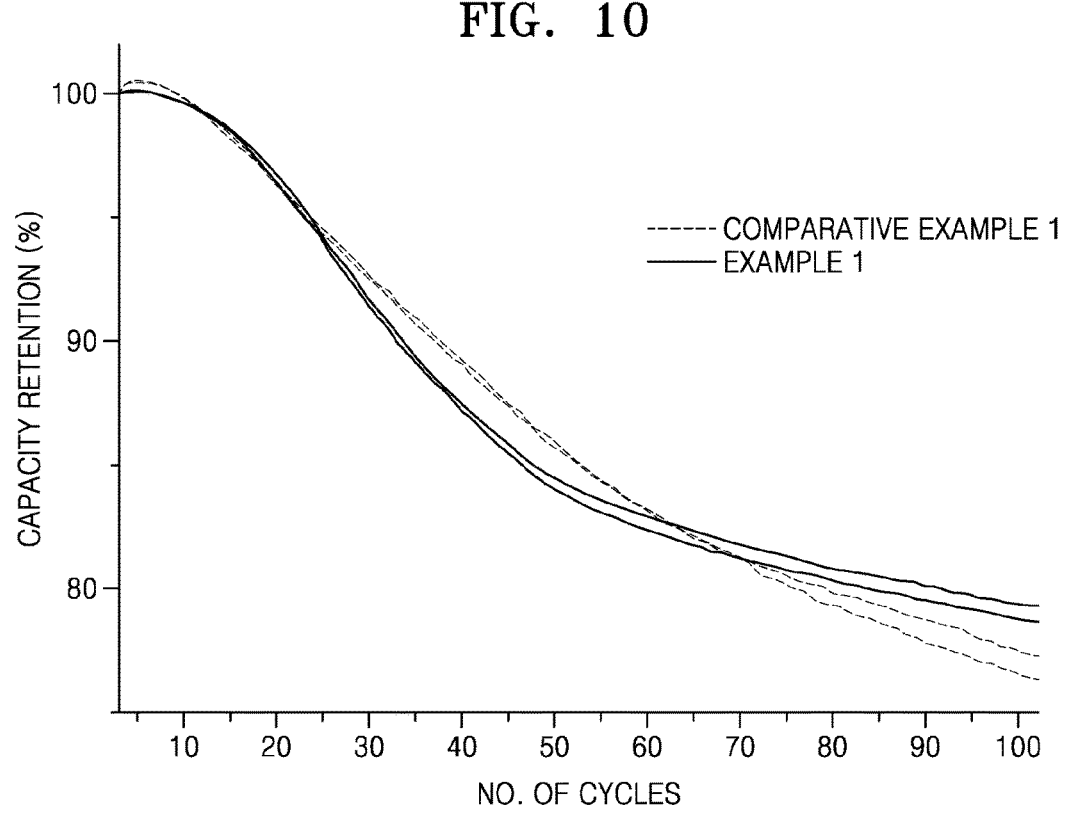
FIG. 10 is a graph of capacity retention (percent, %) versus number of cycles illustrating capacity retentions of coin half cells prepared according to Example 1 and Comparative Example 1 with respect to the number of cycles.

Cycle lifespans of the coin half cells respectively prepared according to Example 1 and Comparative Example 1 were shown in FIG. 10.

Lifespans of the coin half cells respectively prepared according to Example 1 and Comparative Example 1 were evaluated, and the results are shown in Table 1 below.

TABLE 1

|  | Initial discharge capacity (mAh/g) | Initial charge/discharge efficiency *[1](%) | Lifespan*[2](@ 100 times) |
| --- | --- | --- | --- |
| Example 1 | 827 | 90.5 | 79.8 |
| Comparative Example 1 | 768 | 91.3 | 77.8 |

*[1] Initial charge/discharge efficiency = discharge capacity of first cycle/charge capacity of first cycle × 100
*[2] Lifespan = (discharge capacity when discharging cell at C-rate of 1.0 C at $100^{th}$ cycle)/(discharge capacity when discharging cell at C-rate of 1.0 C at first cycle) × 100

Referring to Table 1, the coin half cell prepared according to Example 1 exhibited a higher initial discharge capacity and a longer lifespan than the coin half cell prepared according to Comparative Example 1.

Figure 11:
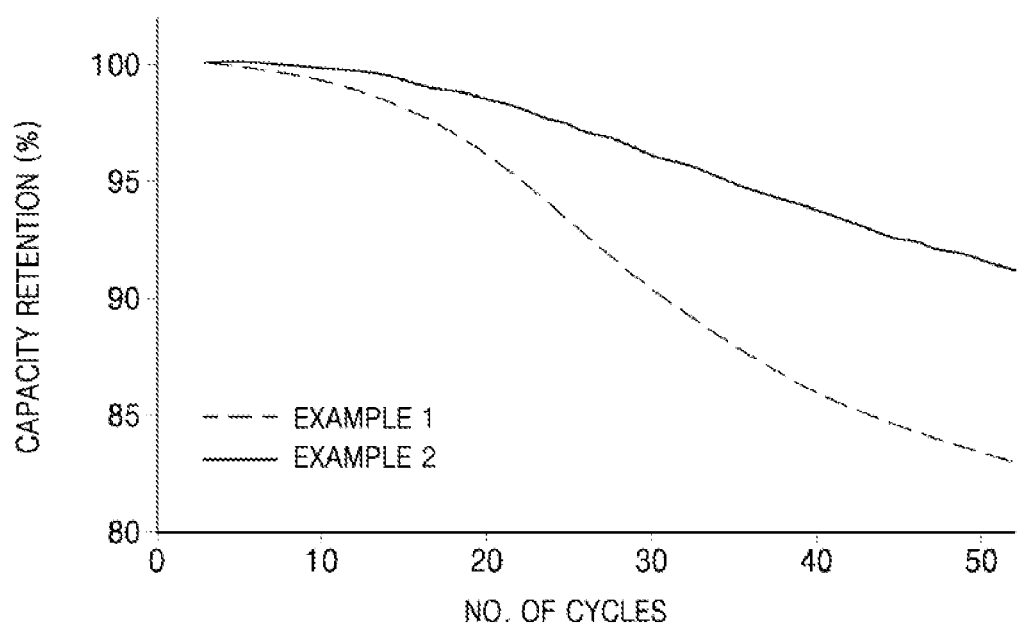
FIG. 11 is a graph of capacity retention (percent, %) versus number of cycles illustrating capacity retention of coin half cells prepared according to Examples 1 and 2 with respect to the number of cycles.

In addition, cycle lifespans of the coin half cells respectively prepared according to Examples 1 and 2 are shown in FIG. 11.

Referring to FIG. 11, the coin half cell prepared according to Example 2 has a longer lifespan than the coin half cell prepared according to Example 1.

Since volume expansion of silicon particles is relieved by the conductive framework having a spherical skein shape in the complex for anode active material, volume expansion of the entire anode is suppressed. Also, since the conductive framework prevents electrical short circuits between metal particles, the capacity of the anode may be maintained at a high level and the lifespan of the lithium secondary battery may be increased. In addition, since the anode has the same surface characteristics as those of conventional graphite owing to the carbon protective shell of the complex for anode active material, the same manufacturing process as manufacturing processes for conventional anodes may be applied to produce the anode without change. Particularly, the anode may be prepared using the same binder, electrolyte, and optionally additional anode active material (i.e., anode active material other than the complex) as those used in the preparation of anodes using other materials.

It should be understood that embodiments described herein should be considered in a descriptive sense only and not for purposes of limitation. Descriptions of features or aspects within each embodiment should be considered as available for other similar features or aspects in other embodiments.

While one or more embodiments have been described with reference to the figures, it will be understood by those of ordinary skill in the art that various changes in form and details may be made therein without departing from the spirit and scope as defined by the following claims.

What is claimed is:
1. A complex for an anode active material, the complex comprising:
 a conductive framework having a spherical skein shape comprising an intertwined network of a fibrous conductive material; and
 metal particles dispersed in the conductive framework, wherein the complex for the anode active material is spherical in shape.

2. The complex for anode active material of claim 1, wherein an overall shape of the conductive framework is defined by a surface of the conductive material in a lengthwise direction.

3. The complex for anode active material of claim 2, wherein the conductive material has an overall spherical shape.

4. The complex for anode active material of claim 1, wherein a fiber of the conductive material has an average diameter of about 0.5 to about 1,000 nanometers.

5. The complex for anode active material of claim 1, wherein a fiber of the conductive material has an average aspect ratio of 10 or greater.

6. The complex for anode active material of claim 1, wherein the conductive material comprises a carbon nanotube, a carbon nanofiber, a conductive metal, a conductive polymer, or a combination thereof.

7. The complex for anode active materials of claim 6, wherein the conductive metal comprises copper, aluminum, iron, zinc, silver, palladium, nickel, titanium, gold, platinum, or a combination thereof.

8. The complex for anode active materials of claim 6, wherein the conductive polymer comprises a polythiophene, a polyacetylene, a poly(paraphenylene), a polyaniline, a poly(paraphenylene vinylene), a polypyrrole, or a combination thereof.

9. The complex for anode active material of claim 6, wherein the conductive material is flexible.

10. The complex for anode active material of claim 1, further comprising an additional conductive material in the conductive framework.

11. The complex for anode active material of claim 1, wherein the conductive framework having a spherical skein shape has a particle diameter of about 0.1 to about 100 micrometers.

12. The complex for anode active material of claim 1, wherein the complex has a bulk density of about 0.1 to about 2.3 grams per cubic centimeter.

13. The complex for anode active material of claim 1, wherein the complex has a porosity of about 10% to about 85%.

14. The complex for anode active material of claim 1, wherein the complex has a root mean square surface roughness of about 0.1 to about 100 nanometers.

15. The complex for anode active material of claim 1, wherein the metal particles comprise silicon, germanium, tin, lead, antimony, bismuth, zinc, aluminum, titanium, nickel, cobalt, cadmium or a combination thereof; an alloy thereof; an oxide thereof; a carbide thereof; a nitride thereof; a sulfide thereof; a phosphide thereof; or a combination thereof.

16. The complex for anode active material of claim 1, further comprising a protective shell surrounding the conductive framework.

17. The complex for anode active material of claim 16, wherein the protective shell comprises a carbonaceous material, an oxide material, a fluoride material, a lithium ion solid electrolyte material, an ionic conductive polymer material, or a combination thereof.

18. The complex for anode active material of claim 17, wherein the carbonaceous material comprises a hard carbon, a soft carbon, graphene, graphite, or a combination thereof.

19. The complex for anode active material of claim 17, wherein the oxide material comprises aluminum oxide, titanium oxide, zinc oxide, iron oxide, zirconium oxide, cerium oxide, tin oxide, silicon oxide, magnesium oxide, or a combination thereof.

20. The complex for anode active material of claim 17, wherein the fluoride material comprises aluminum fluoride, lithium fluoride, iron fluoride, or a combination thereof.

21. The complex for anode active material of claim 17, wherein the lithium ion solid electrolyte material comprises a sulfurous amorphous electrolyte comprising $Li_2S-P_2O_5$, $Li_{1+x+y}Al_xTi_{2-x}Si_yP_{3-y}O_{12}$ wherein x=0.3 and y=0.2, a garnet comprising $Li_7La_3Zr_2O_{12}$, $Li_{10}GeP_2S_{12}$, or a combination thereof.

22. The complex for anode active material of claim 17, wherein the ionic conductive polymer material comprises polyethyleneoxide, polypropyleneoxide, polyethylene glycol, polyacrylonitrile, polymethacrylic acid ester, polyvinylidene fluoride, poly(vinylidene fluoride-hexafluoropropylene) copolymer, poly(methyl acrylate), poly(methyl methacrylate), a blend thereof, a random copolymer thereof, an alternating copolymer thereof, a graft copolymer thereof, a block copolymer thereof, or a combination thereof.

23. The complex for anode active material of claim 16, wherein the protective shell has a thickness of about 0.01 to about 10 micrometers.

24. The complex for anode active material of claim 1, wherein the complex comprises about 10 to about 90 parts by weight of the metal particles, based on 100 parts by weight of the conductive framework.

25. An anode comprising the complex according to claim 1.

26. The anode of claim 25, further comprising an additional anode active material.

27. A lithium secondary battery comprising the anode according to claim 25.

28. A method of preparing a complex for anode active material, the method comprising:
combining a fibrous conductive material and metal particles in a medium to form a dispersion;
agitating the dispersion to form a pre-complex comprising a framework formed of the conductive material and the metal particles dispersed therein; and
applying a shearing force to the pre-complex to form the complex, wherein the complex comprises
a conductive framework having a spherical skein shape comprising an intertwined network of the fibrous conductive material, and
the metal particles dispersed therein,
wherein the complex for the anode active material is spherical in shape.

29. The method of claim 28, further comprising forming a protective shell-forming material on a surface of the complex to form a protective shell on a surface of the complex.

30. The method of claim 29, wherein the forming of the protective shell on the surface of the complex comprises
mixing the complex with the protective shell-forming material to prepare a mixture,
adding the mixture to a bladed hybridization system, and
rotating the blades to apply the shearing force to the mixture.

31. The method of claim 29, wherein the forming of the protective shell on the surface of the complex comprises
mixing the complex with the protective shell-forming material, and
milling the mixture using a ball mill.

32. The method of claim 28, wherein the combining the fibrous conductive material and the metal particles in the medium to form the dispersion further comprises adding a protective shell-forming material to the dispersion to form the protective shell on a surface of the complex.

33. The method of claim 28, further comprising wet-mixing the complex with a protective shell-forming material and drying a product of the wet mixing to form a protective shell on a surface of the complex.

34. The method of claim 28, wherein the medium comprises alcohol, acetone, water, N-methyl-2-pyrrolidone, toluene, tetrahydrofuran, hexane, or a combination thereof.

* * * * *